(12) United States Patent
Hashiya et al.

(10) Patent No.: US 6,333,997 B1
(45) Date of Patent: Dec. 25, 2001

(54) IMAGE RECOGNIZING APPARATUS

(75) Inventors: Kazuyo Hashiya; Osamu Kuratomi, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/327,374

(22) Filed: Jun. 8, 1999

(30) Foreign Application Priority Data

Jun. 8, 1998 (JP) .................................... 10-159200
May 26, 1999 (JP) .................................... 11-146300

(51) Int. Cl.[7] .............................. G06K 9/00; G06K 9/36; G06K 9/46; H04N 1/00; H04N 1/46
(52) U.S. Cl. ......................... 382/201; 382/112; 382/151; 382/181; 382/218; 382/286; 382/289; 382/291; 382/294; 382/295; 358/405; 358/406; 358/504
(58) Field of Search ..................................... 382/106, 112, 382/141, 145, 147, 149, 151, 181, 190, 199, 201, 209, 218, 289, 291, 103, 135, 137, 187, 286, 287, 294–295; 348/129, 169; 358/406, 405, 504

(56) References Cited

U.S. PATENT DOCUMENTS 5,216,724    6/1993  Suzuki et al. ........................ 382/135
5,253,306  * 10/1993 Nishio ................................. 382/112
5,371,810  * 12/1994 Vaidianathan ....................... 382/291
5,377,279  * 12/1994 Hanafusa et al. ................... 382/141
5,680,471  * 10/1997 Kanebako et al. .................. 382/128
5,892,854  *  4/1999 de Queiroz et al. ................ 382/288
5,956,414  *  9/1999 Grueninger ......................... 382/112
5,999,646  * 12/1999 Tamagaki ............................ 382/169

FOREIGN PATENT DOCUMENTS 0 342 060 B1   8/1994   (EP) .
0704 821A2    4/1996   (EP) .
6-318246     11/1994   (JP) .............................. G06F/15/62

* cited by examiner

Primary Examiner—Leo Boudreau
Assistant Examiner—Daniel G. Mariam
(74) Attorney, Agent, or Firm—Pillsbury Winthrop LLP

(57) ABSTRACT

A parameter input section inputs, as parameters, the luminance difference between a to-be-recognized object P and its background, conveyance conditions, etc. An endpoint detecting section uses the parameters to detect a plurality of border points between the object P and the background, without being influenced by external noise or a stain on the object P. A length detecting section detects vertical and horizontal lengths of the object P, and an entire-object position determining section determines the position of the entire object P using the lengths detected by the section. A recognizing section compares an image input by an image input section, with reference image data stored in a reference image data memory, thereby recognizing the object P.

16 Claims, 17 Drawing Sheets

LINE APPROXIMATE TO UPPER SIDE

LINE APPROXIMATE TO LOWER SIDE

LINE APPROXIMATE TO LEFT SIDE

LINE APPROXIMATE TO RIGHT SIDE

UPPER LEFT COORDINATES

COORDINATES OF CENTER

| ADDRESS | |
|---|---|
| 00H | PROCESS NUMBER 3 |
| 01H | NUMBER OF DETECTED ENDPOINT |
| 02H | DISTANCE OF A PAIR OF ENDPOINTS |
| 03H | DISTANCE OF A PAIR OF ENDPOINTS |
| . | . |
| . | . |
| | PROCESS NUMBER 9 |
| | NUMBER OF DETECTED ENDPOINT |
| | DISTANCE OF A PAIR OF ENDPOINTS |
| | DISTANCE OF A PAIR OF ENDPOINTS |
| | . |
| | . |

IMAGE RECOGNIZING APPARATUS

BACKGROUND OF THE INVENTION

This invention relates to an image recognizing apparatus, for use in a print inspecting apparatus for inspecting printed states of printed matters, for recognizing images on the printed matters conveyed.

In an image recognizing apparatus for picking up, as image data, images on conveyed to-be-recognized objects (e.g. printed matters), and comparing them with a reference image to identify them, it is necessary to accurately align the reference image with an image on each to-be-recognized object in order to estimate the degree of correspondence therebetween. However, in the image recognizing apparatus, the to-be-recognized object skews or slides while it is conveyed, and different objects to be recognized assume different conveyance states.

In light of the above, it is necessary to accurately detect to-be-recognized objects one by one. In the case of a recognition section incorporated in the conventional print apparatus, a detection method has been proposed, in which detection and positioning are performed with reference to a mark ("+" which is called a "register mark", or a line) printed on a medium together with a to-be-recognized object. Further, where the format of a to-be-recognized object is known as in the case of a document, journal or a driver's license, a horizontal rule in the to-be-recognized object is sometimes used as a reference for positioning.

In addition, Japanese Patent Application KOKAI Publication No. 6-318246 discloses a method used in a case where there is no reference within a to-be-recognized object. Specifically it discloses a method for correcting and positioning an image on the basis of information output from a sensor for detecting the conveyance state of a to-be-recognized object.

As described above, there has been employed a method for printing a positioning reference mark as well as a to-be-recognized object, a method for performing positioning using a horizontal rule within a to-be-recognized object, or a method which uses a sensor for sensing a conveyance state. These methods, however, have disadvantages as described below.

In the method for printing a positioning reference mark as well as a to-be-recognized object, it is necessary to previously print, as well as a to-be-recognized object, a pattern as the reference mark outside the to-be-recognized object. Moreover, it is necessary to provide a cutting mechanism for removing the reference mark pattern after printing.

The method for performing positioning using a horizontal rule within a to-be-recognized object uses a pattern within an object and is therefore free from the aforementioned problem. However, this method cannot be applied to a to-be-recognized object which does not include such a reference horizontal rule.

Furthermore, a method which uses a sensor for sensing a conveyance state requires such a conveyance state sensing sensor in addition to a sensor for picking up an image, which means that the method requires a large scale apparatus.

BRIEF SUMMARY OF THE INVENTION

It is the object of the invention to provide an image recognizing apparatus capable of accurately detecting and recognizing to-be-recognized objects even if the positions of input images of the objects vary one by one.

A line sensor reads a to-be-recognized object conveyed, and stores image data indicative of the object in an image memory. A parameter input section inputs, as parameters, the luminance difference between the object and its background, conveyance conditions, etc. An endpoint detecting section detects the border between the image of the object stored in the image memory and the background, on the basis of pairs of endpoints that are located on vertical and horizontal lines passing through the to-be-recognized object. At this time, the endpoint detecting section uses the parameters to detect a plurality of pairs of endpoints without being influenced by external noise or a stain on the object.

A length detecting section detects vertical and horizontal lengths of the to-be-recognized object, and a position determining section determines the four corners and the center of the entire to-be-recognized object, using the detected lengths. A recognizing section compares the image input by the image input section with reference image data stored in a reference image data memory, thereby recognizing an image on the object.

The position determining section includes an extracting section for extracting a partial area of the to-be-recognized object on the basis of the corner coordinates judged by a corner judging section. The recognizing section includes a section for comparing the partial area extracted by the extracting section, with a corresponding area in the reference image, thereby recognizing the image input by the image input section.

Furthermore, the recognizing section includes a determining section for comparing lengths supplied from the length detecting section with a distance between each pair of endpoints supplied from the endpoint detecting section, extracting effective endpoint pair information, and determining, on the basis of the number of the extracted pairs of endpoints, whether or not the position of the entire to-be-recognized object can be detected; an accumulating section for accumulating endpoint pair information concerning the to-be-recognized object if the determining means determines that the position of the to-be-recognized object cannot be detected; a display section for displaying a determination result of the determining means if the result indicates that the position of the entire to-be-recognized object cannot be detected; and an abnormal portion estimating section for estimating an abnormal portion of the image recognizing apparatus on the basis of the endpoint information accumulated by the accumulating section.

When in the apparatus of the invention, cases where the to-be-recognized object cannot be detected have occurred continuously, the apparatus warns the user and estimates an abnormal portion thereof. Thus, an abnormal portion, if any, can be detected at an early stage.

In addition, the conveyance state of each to-be-recognized object is judged, and the parameters are changed on the basis of the judgment result. Accordingly, the to-be-recognized object can be detected more accurately.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram illustrating the structure of an image recognizing apparatus according to a first embodiment of the invention.

DETAILED DESCRIPTION OF THE INVENTION

The embodiments of the invention will be described with reference to the accompanying drawings.

A first embodiment will be described.

Figure 1:
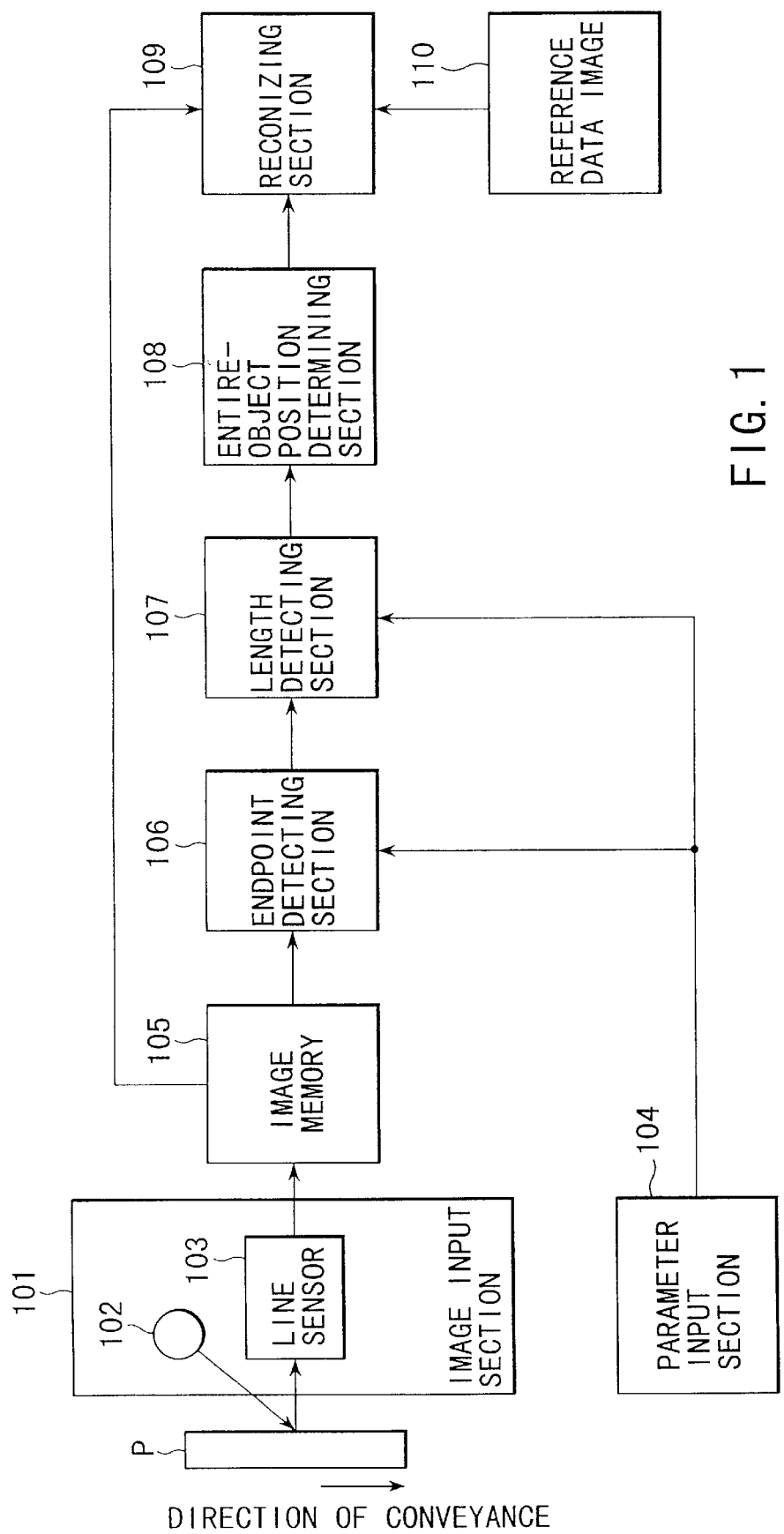

FIG. 1 is a block diagram illustrating the structure of an image recognizing apparatus according to a first embodiment of the invention. Suppose that a to-be-recognized object (this may be called just an "object") P such as a printed matter is conveyed in a direction indicated by the arrow in FIG. 1. An image printed on the conveyed object P to be recognized is read and input by an image input section 101. The image input section 101 comprises a light source 102 for emitting light onto the conveyed object P, and a line sensor 103 serving as photoelectric conversion means for receiving light reflected from or transmitted through the to-be-recognized object P and converting it into an electric signal. The light source 102 and the line sensor 103 are arranged such that their lengths are perpendicular to the direction of conveyance of the to-be-recognized object P.

A parameter input section 104 is used to input information on the to-be-recognized object P or on the allowable range of conveyance, and comprises an input section 111 such as a keyboard, a ten key, a mouse, a touch panel, etc., a display section 112 such as an LED for displaying the input data, and a memory 113 storing parameters. Where an electronic file which stores parameters is previously prepared, the parameters can be downloaded into the memory 113.

The signal output from the line sensor 103 is first digitized in the image input section and then stored in an image memory 105. The image data stored in the image memory 105 is transmitted to an endpoint detecting section 106 and a recognizing section 109.

The endpoint detecting section 106 detects, from the image data supplied from the image memory 105, endpoints which are border points between the to-be-recognized object P and its background. A length detecting section 107 detects the vertical length and the lateral or horizontal length of the to-be-recognized object P on the basis of the endpoints detected by the endpoint detecting section 106, and compares the detected lengths with all distances between the endpoints, thereby determining whether or not the detected pair of endpoints are effective.

An entire-object position determining section 108 determines the position of the entire object P on the basis of the lengths detected by the length detecting section 107. The recognizing section 109 recognizes an image on the to-be-recognized object P on the basis of the position determined by the entire-object position determining section 108, and with reference to reference image data (dictionary data) stored in a reference image data memory 110.

Each process will now be described in detail.

Figure 3:
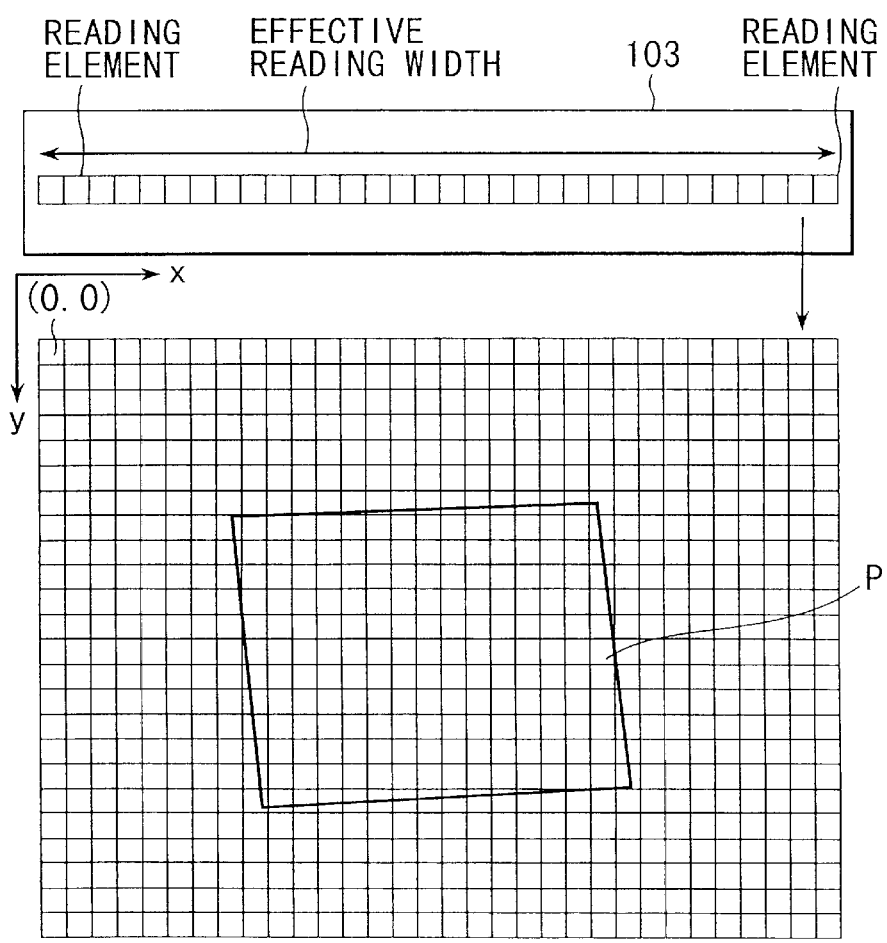
FIG. 3 is a view showing the relationship between a reading element incorporated in a line sensor and an image memory.

FIG. 3 shows the relationship between each of reading elements incorporated in the line sensor 103 and image data stored in the image memory 105. As is shown in FIG. 3, an image of the to-be-recognized object P conveyed indicates that the object P skews. This skew state is caused by the rotation of the to-be-recognized object P which occurs when its image is input, and is considered a factor which should be excluded when the object P is recognized.

The line sensor 103 includes a number N of reading elements. This number is determined on the basis of the width of the to-be-recognized object P, a desired resolution, an estimated degree of skew and an estimated vertical shift perpendicular to the direction of conveyance (hereinafter referred to as "slide").

Figure 4:
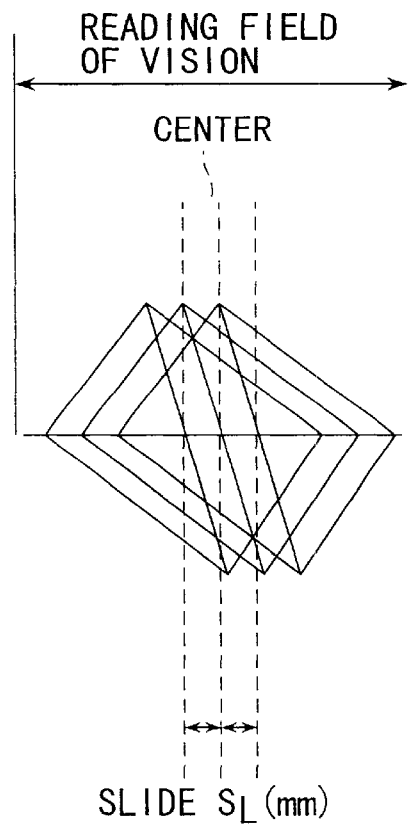
FIG. 4 is a view showing the range of the reading field of the line sensor.

In a case where the range of slide can be limited by the properties of the conveyance mechanism, the minimum number A of reading elements is given by the following equation (1), as is understood from FIG. 4:

$$\text{Number } A \text{ of readig elements} = \left(\sqrt{(x^2 + y^2)} + 2 \times S_L + 2\right) \times d \quad (1)$$

where x (mm) represents the length of one side of the to-be-recognized object P, which is perpendicular to the conveyance direction, y (mm) another side perpendicular to the side, d (the number of lines/mm) the resolution of reading, ±$S_L$ (mm) the range of slide, and "2" in the parenthesis the number of pixels in the margin (this means that even when the degree of slide assumes a maximum value in the allowable range, the background can be read by at least two pixels).

The effective reading width given by the equation (1) enables grasping of an image of the entire to-be-recognized object P irrespective of occurrence of "skew" or "slide". Furthermore, where the range of skew can be limited by the conveyance mechanism, the minimum number B of reading elements is given by the following equation (2):

$$\text{Number } B \text{ of reading elements} = \left(\frac{x}{\cos\theta} + 2 \times S_L + 2\right) \times d \quad (2)$$

where θ (°) represents the degree of skew, and x (mm) the length of the one side of the object P which is perpendicular to the conveyance direction. The number B of reading elements is smaller than the number A of reading elements. This means that an image of the entire object P can be input using a smaller number of reading element when the degree of skew can be limited.

The parameters input by the parameter input section 104 are, specifically, the vertical length and the lateral or horizontal length of the to-be-recognized object P, the difference in luminance between the background and the to-be-recognized object P, and image reading resolution. The vertical and horizontal lengths of the to-be-recognized object P are expressed in exactly the same scale (mm), while the size to be input into the image memory 105 is obtained by multiplying the exact same scale by the image reading resolution (lines/mm).

Figure 5:
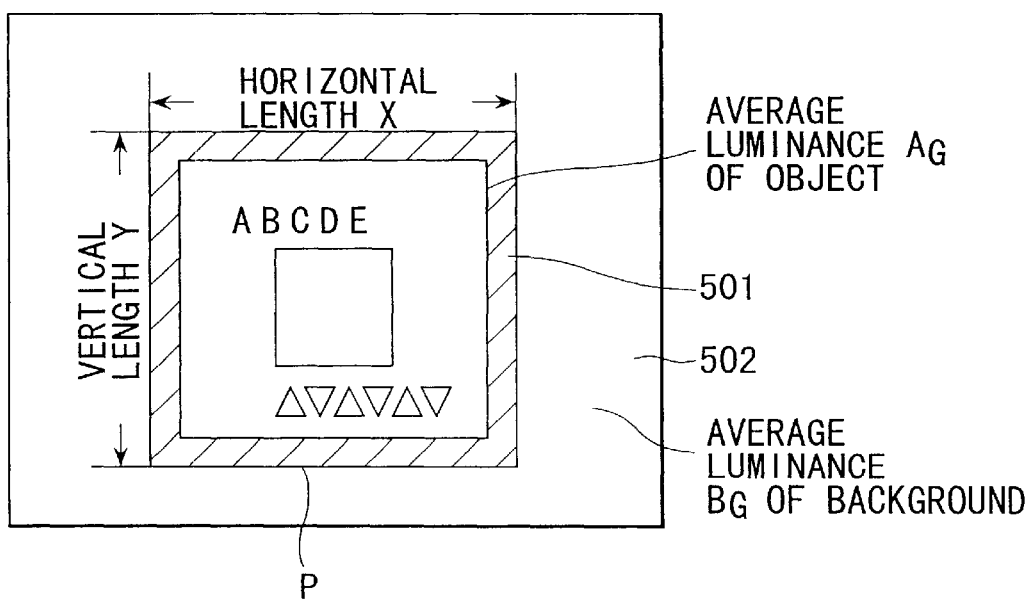
FIG. 5 is a view showing an example of a to-be-recognized object.

Referring to FIG. 5, specific examples of the parameters will be described. In FIG. 5, Y represents the vertical length of the to-be-recognized object P, and X the horizontal length. Supposing that there is no pattern on an outer peripheral portion of the to-be-recognized object P, and that $A_G$ represents the average luminance of a hatched peripheral portion 502 of the object P, and $B_G$ the average luminance of the background 502 of the object P, the luminance difference sub between the background 502 and the to-be-recognized object P is given by $$\text{sub} = |A_G - B_G|$$

If the luminance difference is small, the to-be-recognized object P can be easily recognized by darkening the background when a peripheral portion 501 of the object P is bright, and brightening the background when the peripheral portion 501 is dark.

Further, the range of skew or slide can be also input as a parameter. In this case, the detection performance can be further enhanced.

The endpoint detecting section 106 specifically detects each pair of border points between the to-be-recognized object P and the background 502, from at least a second column and a second row of a pixel matrix on the image memory 105. The discrimination of the to-be-recognized object P from the background 502 is performed on the basis of the luminance level of each pixel on the image memory 105. The luminance level of each pixel assumes a value obtained by digitizing the output signal of the line sensor 103. In the description below, the luminance can have one of 256 levels since each pixel is digitized by 8 bits. Accordingly, white and black have levels "255" and "0", respectively.

Figure 6:
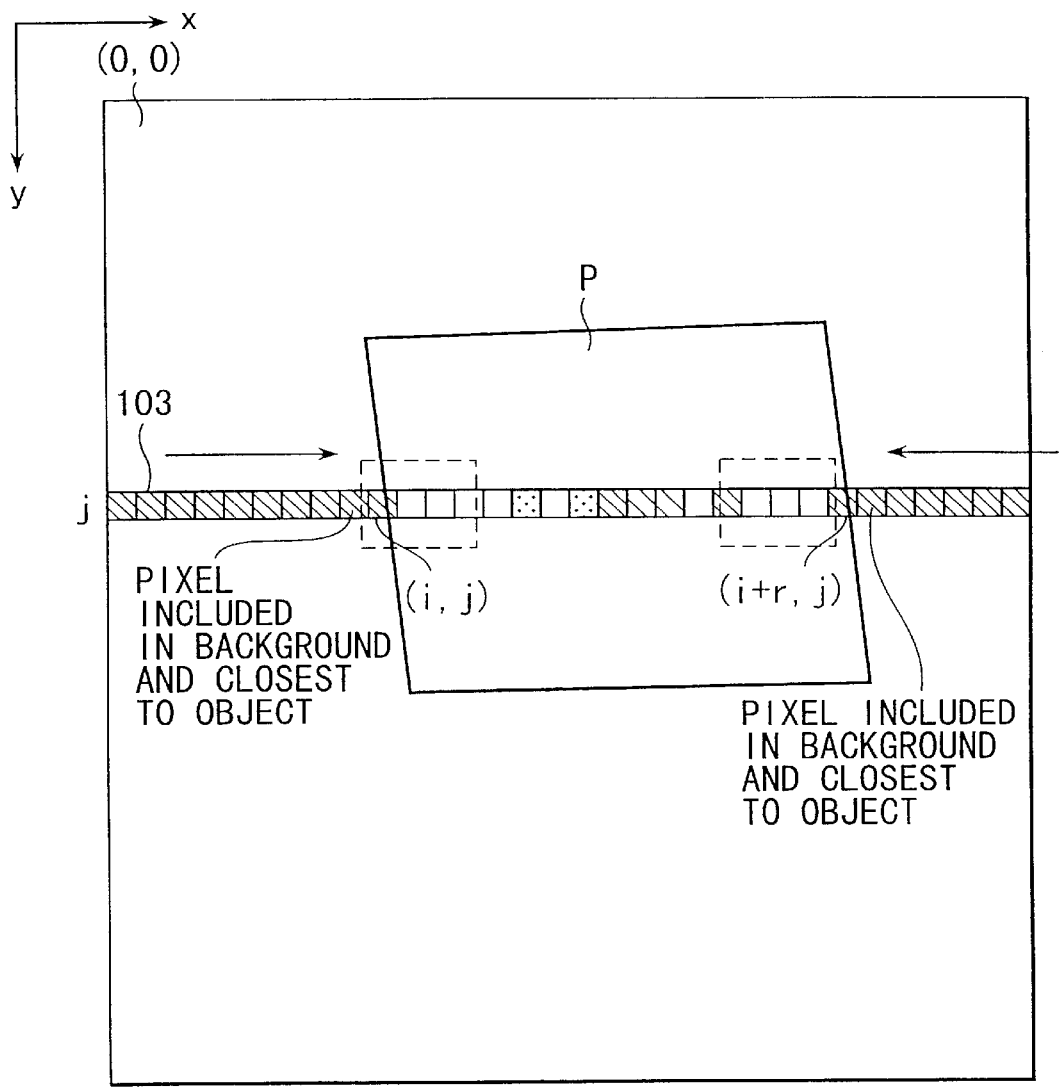
FIG. 6 is a view useful in explaining detection of an endpoint.
Figure 7:
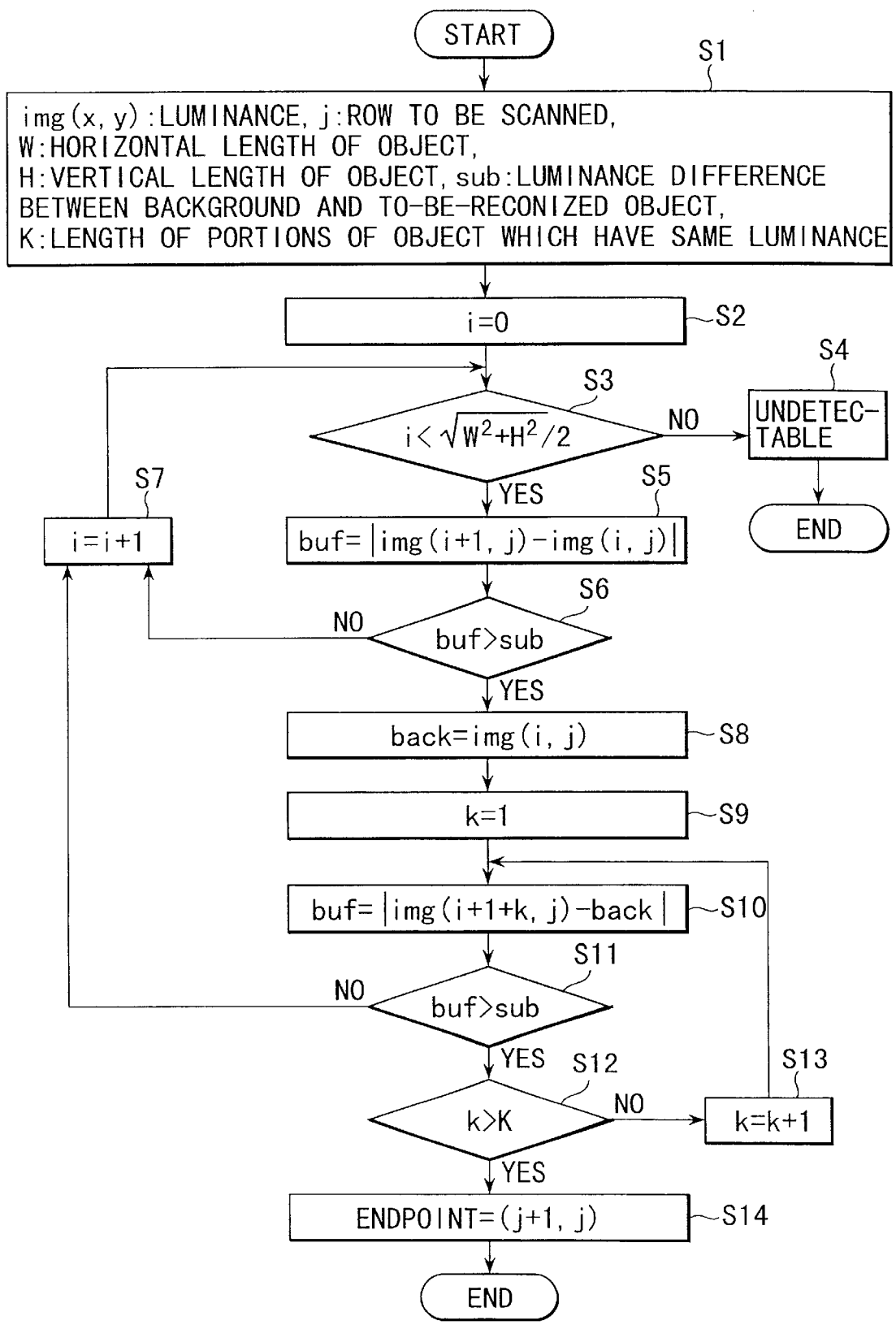
FIG. 7 is a flowchart useful in explaining a process for detecting the endpoint.

Referring then to FIGS. 6 and 7, detection of endpoints in the horizontal direction will be described. FIG. 6 shows a case where endpoints of a row j are detected. One square corresponds to one pixel, and in this case, the background is dark, a peripheral portion of the to-be-recognized object P is bright, and a central portion of the object P is of a variable density. (i, j) and (i+r, j) indicate detected endpoints.

FIG. 7 is a flowchart useful in explaining the manner of detecting endpoints. The manner of the detection will be described with reference to the flowchart. This flowchart relates to a method for detecting a left-hand endpoint. First, suppose that the luminance of a target image is represented by img (x, y), the row of scanning by j, the horizontal length of the to-be-recognized object P by w, the vertical length of the object P by H, the luminance difference between the object P and its background by "sub" (parameter), and the length of an area around the object P in which no pattern exists by K (step S1).

The luminance difference "buf" between a pixel (0, j) and an adjacent pixel located on the right is calculated. Then, the luminance difference "buf" between the pixel (0, j) and a pixel located adjacent to the adjacent pixel on the right is calculated. Thus, this calculation continues until a first pixel is reached at which the difference "buf" is higher than the luminance difference "sub" between the to-be-recognized object P and the background, said luminance difference "sub" being input as a parameter (step S6). If the distance between the target pixel and the pixel (0, j) exceeds ½ the diagonal line of the to-be-recognized object P (if the answer to the question at a step S3 is NO) before the first pixel is reached, scanning is stopped, determining that any endpoint which is effective to determine the position of the to-be-recognized object P could not be found.

Although the scanning start point is set at (0, j) in this embodiment, it can be limited if the range of slide can be limited. Specifically, supposing that the actual length of one side of an object perpendicular to the conveyance direction is x (mm), and the range of slide is ±$S_L$ (mm), it suffices if the scanning is started from a point which is separated from the center of the field of vision by (x/2)+$S_L$+1.

Figure 8A:
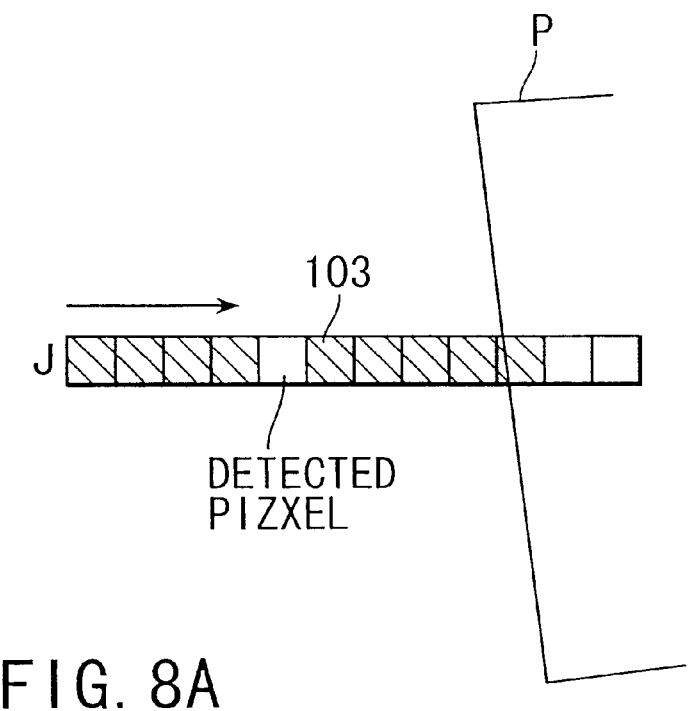
FIGS. 8A and 8B are views useful in explaining an example of a manner of erroneously detecting an endpoint.
Figure 8B:
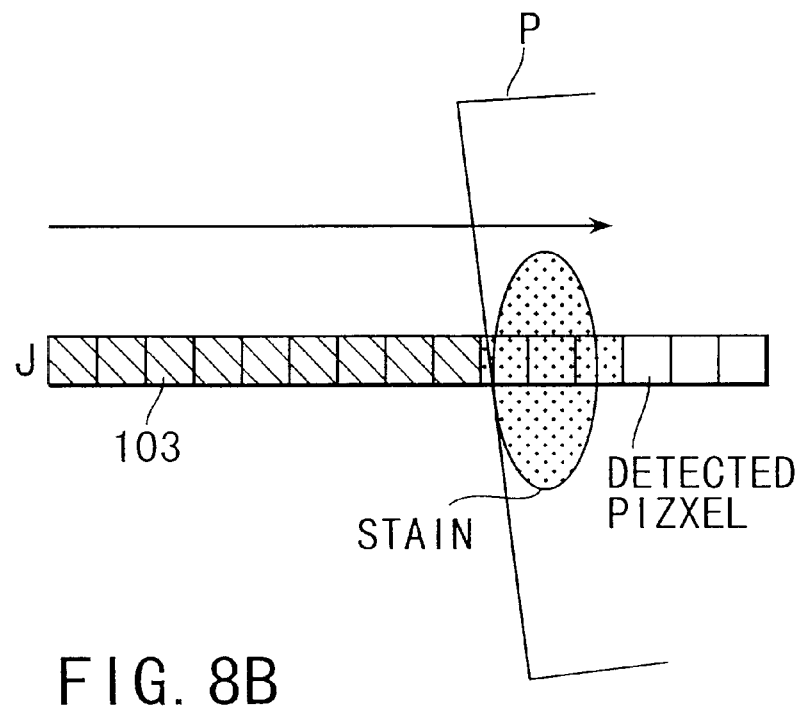

As is shown in FIG. 8A, the pixel detected as a border point between the to-be-recognized object P and the background may be a pixel located outside the actual pixel as a result of the influence of noise. Further, where the to-be-recognized object P has an end deformed due to, for example, a stain as shown in FIG. 8B, that pixel may be one inside the end of the object P.

On the other hand, a peripheral portion of the to-be-recognized object P (the hatched peripheral portion 501 in FIG. 5) is supposed to have no pattern. In other words, the periphery of the to-be-recognized object P consists of pixels of similar luminance values. This property is used to exclude variation factors such as noise, a stain, etc.

More specifically, at steps S8–S13 of the invention, the luminance difference "buf" between the luminance of the target pixel and the luminance "back" of a pixel detected immediately before a pixel detected as a border point between the to-be-recognized object P and the background (i.e. a pixel which is included in the background and closest to the to-be-recognized object P) is calculated for each of a number K of pixels. If the calculated luminance differences are all higher than the parameter "sub" (the luminance difference between the to-be-recognized object P and the background), the positional information (i+1, j) on the first detected pixel is extracted as the endpoint.

When a right-hand endpoint is detected, the scanning is changed to left-hand scanning. Further, when a vertical endpoint is detected, it can be detected by performing upward scanning and downward scanning of a certain one column.

Endpoint detection is realized by detecting at least two pairs of horizontal or vertical points. Preferably, as many pairs as time permits should be detected. When it is necessary to limit the number of pairs to be detected, horizontal scanning rows or vertical scanning columns are selected over a wide range of the to-be-recognized object P without portions of the object P close to its four corners. As a result, endpoint detection over a smaller range due to skew than an effective width, or endpoint detection in which detection incapability due to a stain is suppressed can be realized.

Referring to FIGS. 9–13, the length detecting section 107 and the entire-object position determining section 108 will be described.

Figure 9:
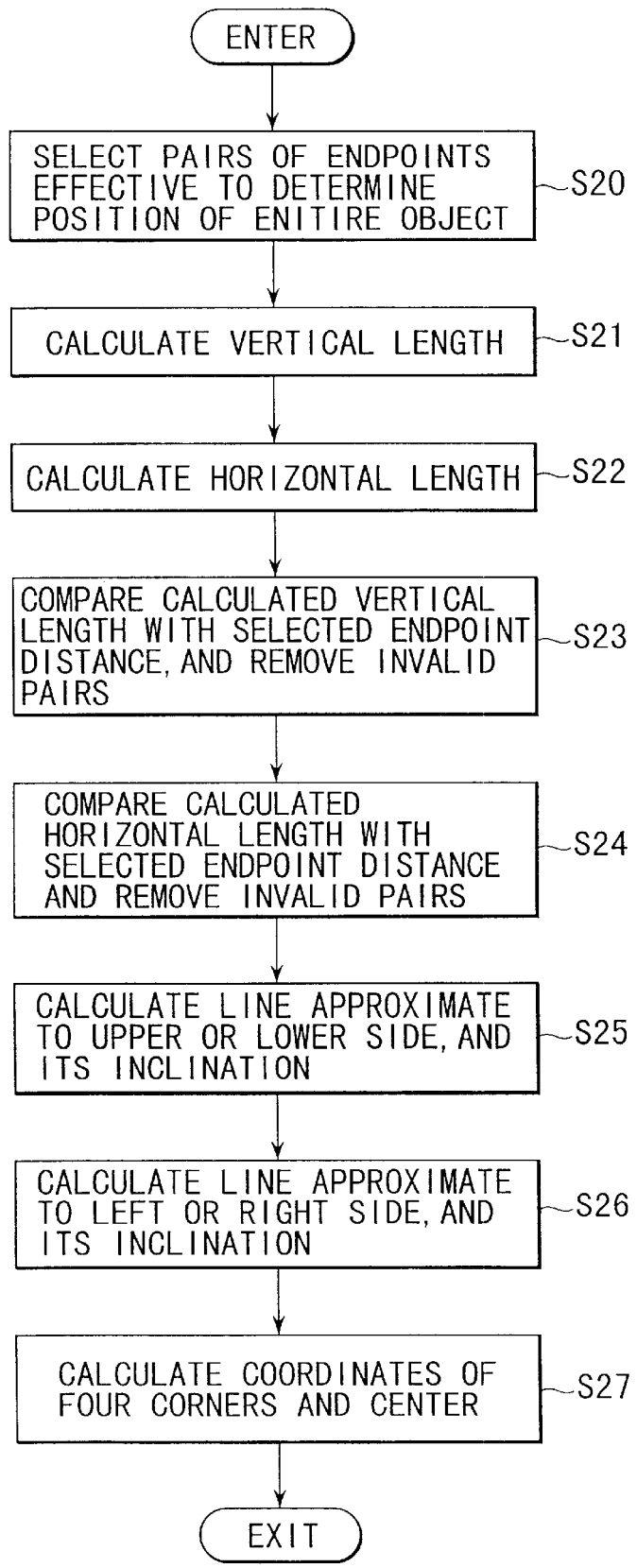
FIG. 9 is a flowchart useful in explaining the operations of a length detecting section and an entire-object position determining section.

FIG. 9 is a flowchart useful in explaining the rough operation of the length detecting section 107 and the entire-object position determining section 108. First, the length detecting section 107 selects, from the pairs of endpoints detected by the endpoint detecting section 106, those effective to determine the position of the entire object P (step S20).

Figure 10A:
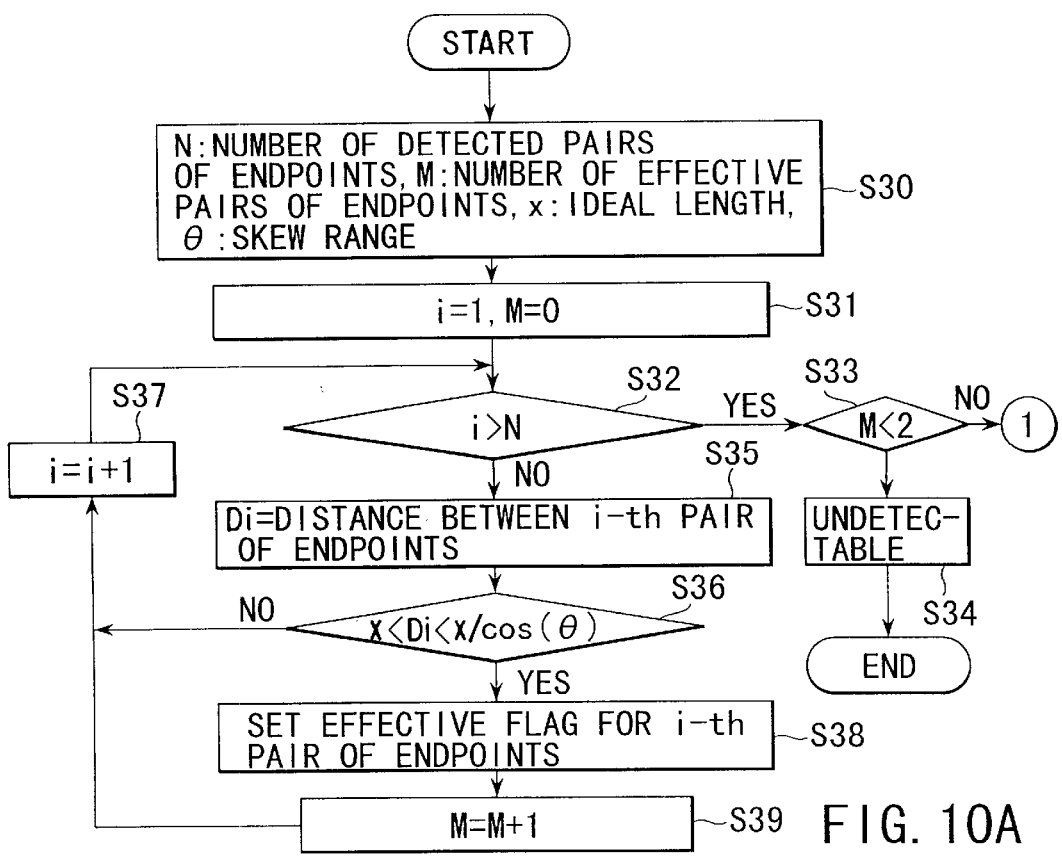
FIGS. 10A–10D are flowcharts useful in explaining, in detail, the operations of the length detecting section and the entire-object position determining section.

FIG. 10A is a flowchart useful in explaining the step S20 in detail. The length detecting section 107 calculates the distance between the endpoints detected by the endpoint detecting section 106, thereby determining whether or not the distance satisfies the conditions. Specifically, where an ideal length and a skew range are input in the parameter input section 104, the length detecting section 107 calculates the distance D between the endpoints (step S35), setting the ideal length at x and the skew range at θ (step S30). After that, it is determined at a step S36 whether or not the calculated distance D falls within a range of from x to x/cos θ. The pair of endpoints which satisfy this condition is determined effective and an effective flag is set for the pair (step S38). Where the skew range is not limited, the pair of endpoints whose distance is shorter than the diagonal line of the to-be-recognized object P is determined effective. The length detecting section 107 performs such a determination for each vertical or horizontal pair of endpoints, thereby determining effective vertical and horizontal pairs of endpoints.

Figure 11:
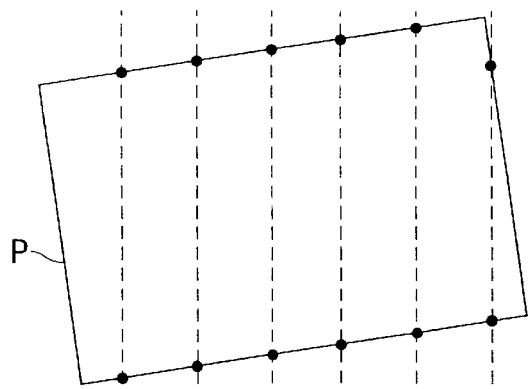
FIG. 11 is a view showing pairs of endpoints detected in the vertical direction.

Subsequently, the length detecting section 107 calculates a vertical length (step S21). FIG. 11 is a view useful in explaining the calculation of the vertical length. In FIG. 11, black dots indicate extracted endpoints, and those of the endpoints which are connected by each of the broken lines are a corresponding pair of the endpoints. The vertical length can be set at the average of the distances between the pairs of endpoints. However, there is a pair of endpoints as the rightmost pair in FIG. 11, whose distance is shorter than the actual length due to the influence of skew. Also, where the endpoint positions are erroneously determined because of a stain, the distance of a pair of endpoints assumes a lower value.

Figure 10B:
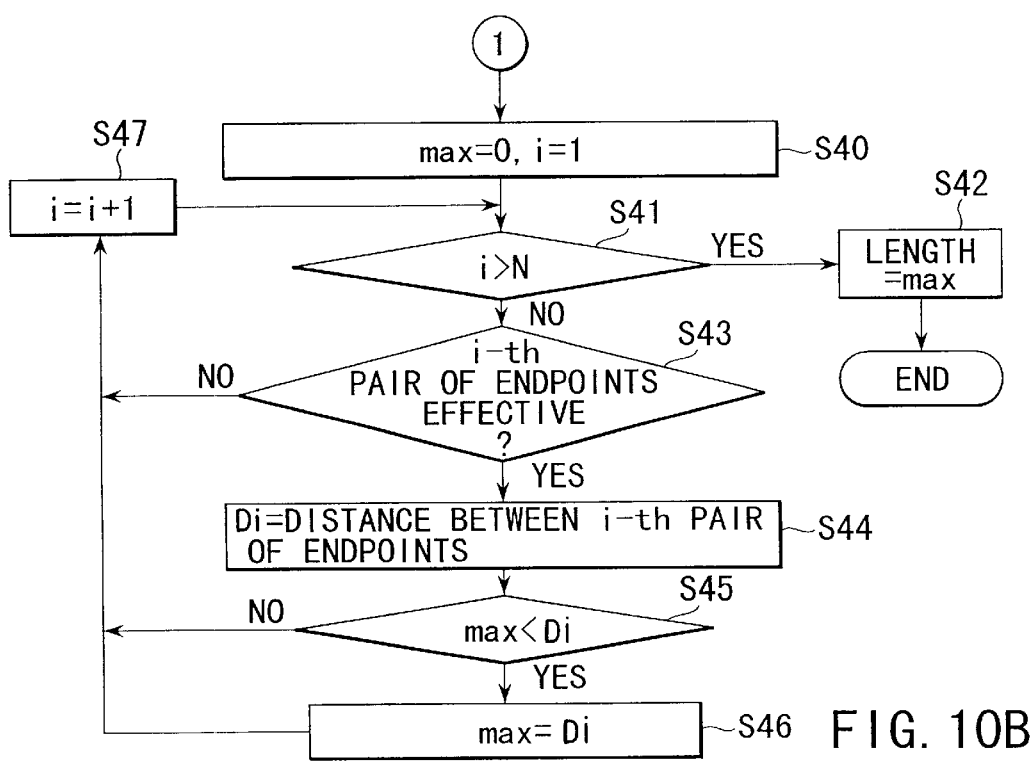
Figure 10C:
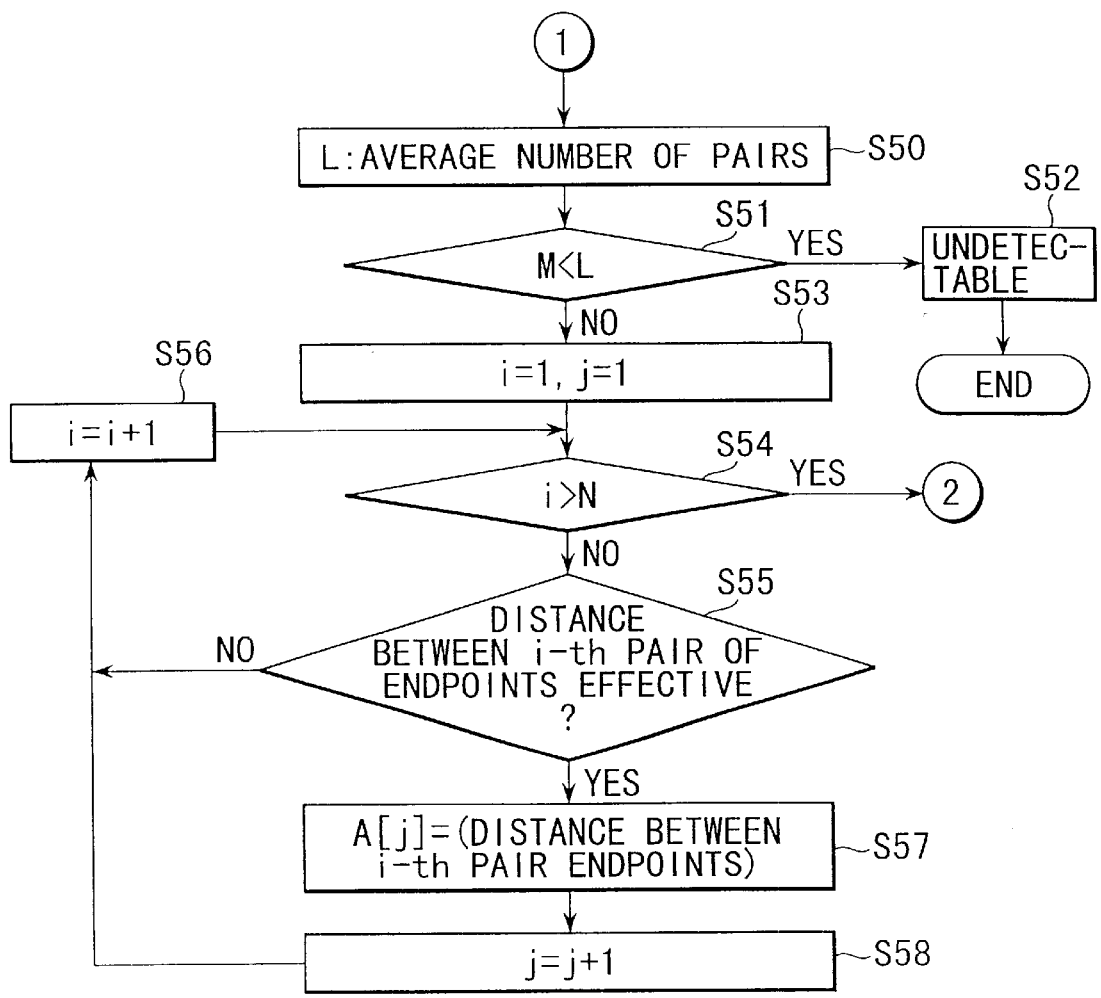
Figure 10D:
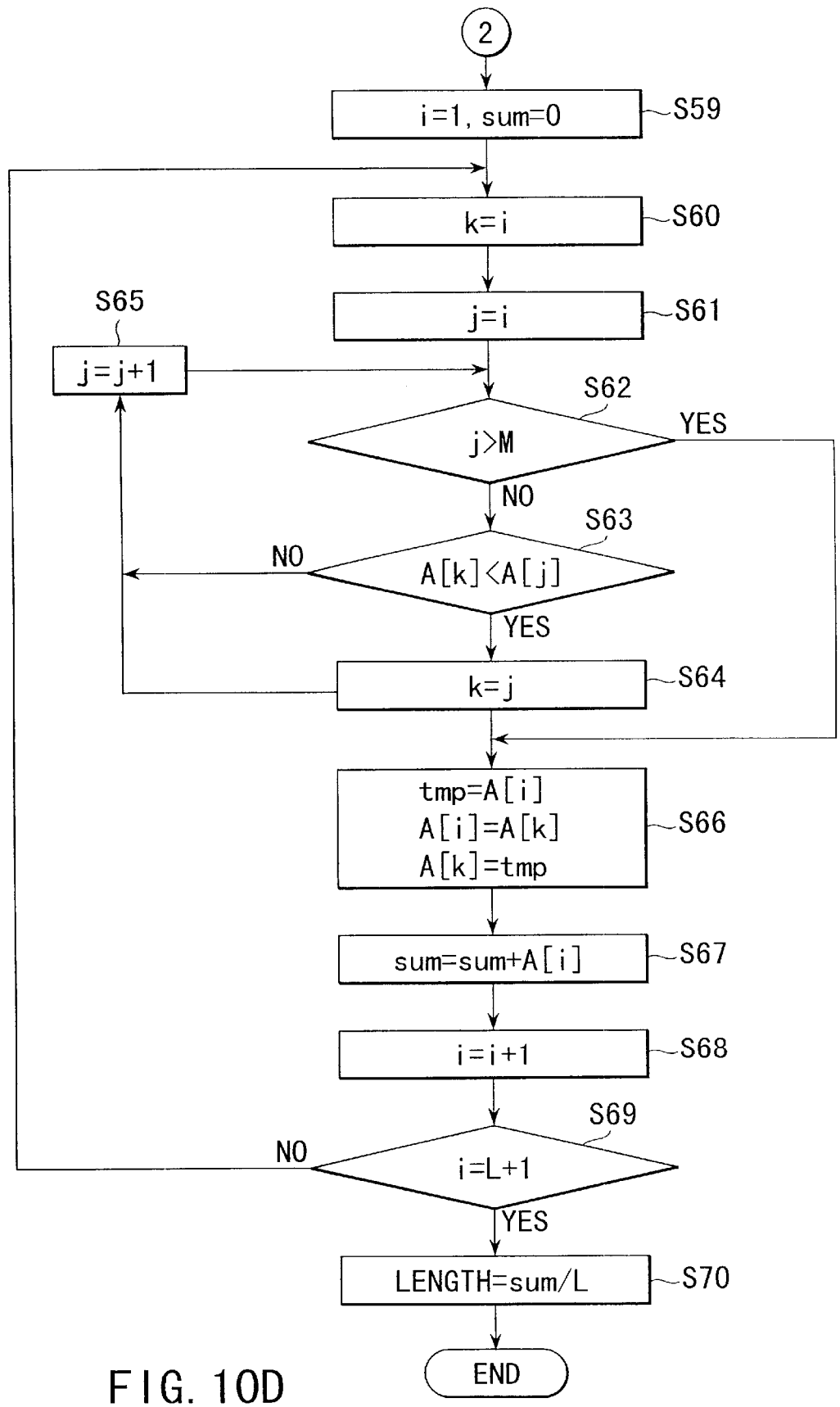

To eliminate those variation factors, the vertical length is set at the maximum one of the distances between the endpoints, or at the average of those distances between several pairs of endpoints, which include the maximum one and ones closer to it. FIG. 10B is a flowchart useful in explaining how to obtain the maximum endpoint distance, while FIGS. 10C and 10D are a flowchart useful in explaining the average of those distances between several pairs of endpoints, which include the maximum one and ones closer to it. A horizontal length is calculated, at a step S22, in a similar manner to the calculation of the vertical length at the step S21.

Thereafter, the entire-object position determining section 108 compares the distance between the selected pair of vertical endpoints obtained at the step S20 with the vertical length obtained at the step S21. If they significantly differ from each other, the selected pair of vertical endpoints is determined invalid and excluded (step S23).

Similarly, the entire-object position determining section 108 compares the distance between the selected pair of horizontal endpoints obtained at the step S20 with the horizontal length obtained at the step S22. If they significantly differ from each other, the selected pair of horizontal endpoints is determined invalid and excluded (step S24).

Figure 12A:
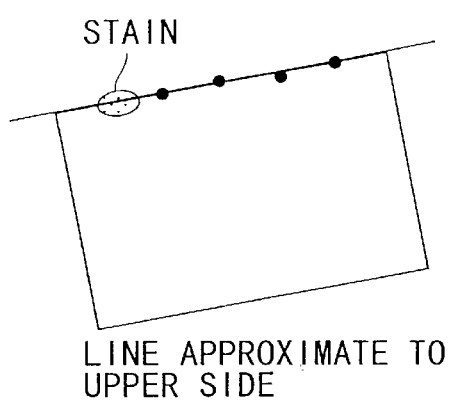
FIGS. 12A–12F are views useful in explaining the operation of the entire-object position determining section.
Figure 12B:
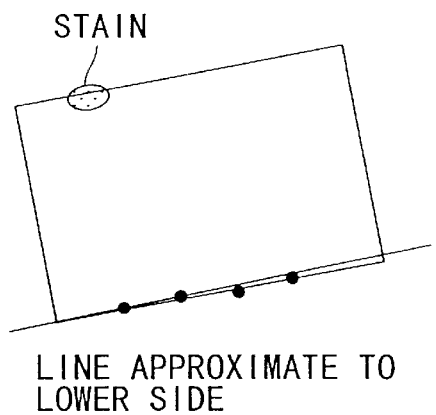

After that, the entire-object position determining section 108 detects, at a step S25, a line approximate to the upper or lower side of the object and the inclination of the line. Specifically, the endpoints determined effective at the step S23 are divided into an upper endpoint group as shown in FIG. 12A and a lower endpoint group as shown in FIG. 12B. From these endpoint groups, an approximate line corresponding to the upper side or lower side of the outer frame of the to-be-recognized object P is obtained.

Figure 12C:
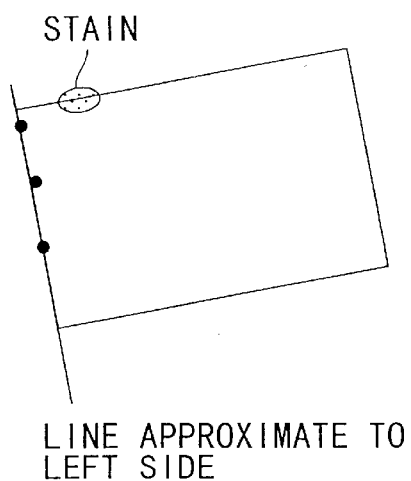
Figure 12D:
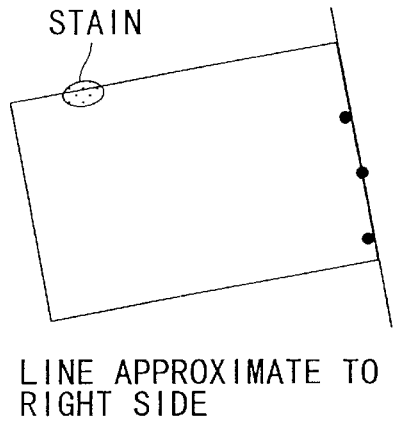

The approximate line can be calculated by the publicly known least square method. Specifically, supposing that the approximate line to be obtained is y=ax+b, the coefficients a and b are determined so that they will make minimum the sum of squares of the distances between the line and the already obtained (i.e. effective) endpoints. The thus-obtained coefficient a indicates the inclination dy of the approximate line. Such an approximate line can also be obtained concerning the left or right side of the object P, as is shown in FIGS. 12C and 12D (step S26).

Figure 13:
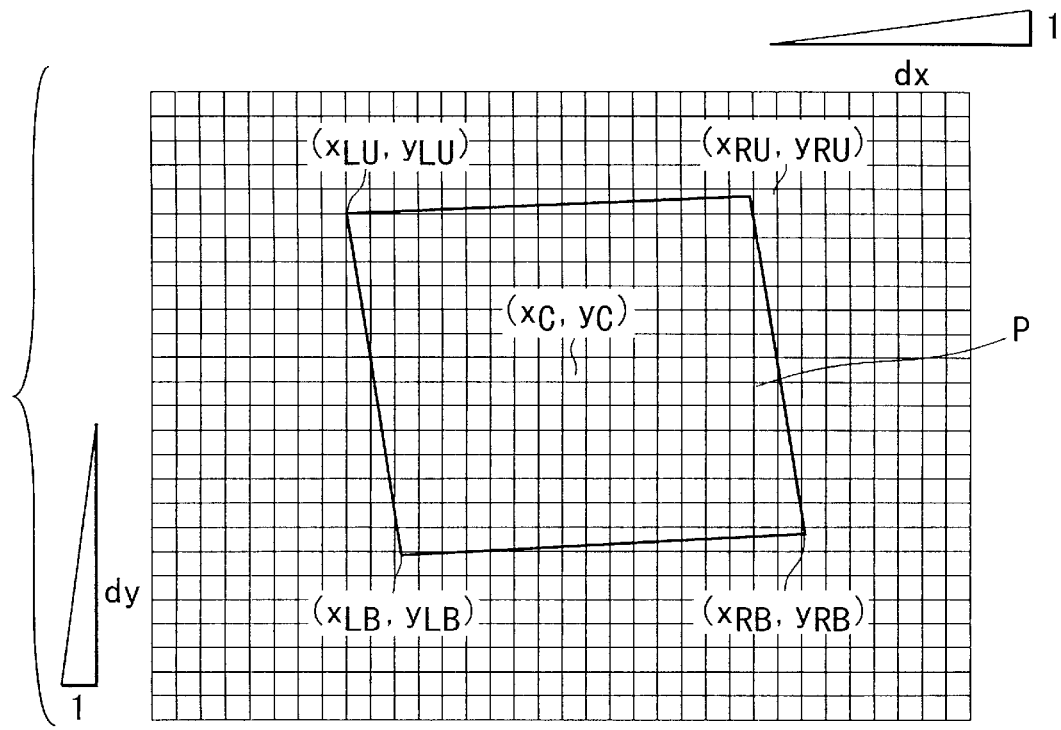
FIG. 13 is a view illustrating an example in which the position of the entire image of a to-be-recognized object is determined on a memory.
Figure 12E:
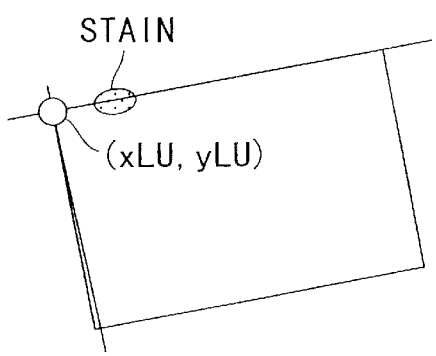
Figure 12F:
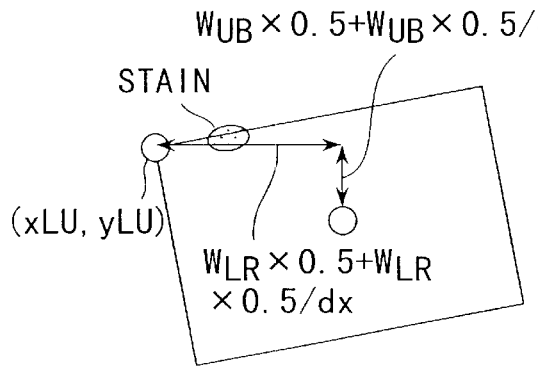

After that, the entire-object position determining section 108 calculates the coordinates of the four corners and the center. The coordinates of the four corners can be obtained by calculating the intersections of the calculated lines which form the outer frame of the to-be-recognized object P, as is shown in FIGS. 12E and 12F. Supposing, for example, that the upper side of the to-be-recognized object P is y=$a_U$x+$b_U$, and the left side is y=$a_L$x+$b_L$, as is shown in FIG. 13, the coordinates ($x_{LU}$, $y_{LU}$) of the upper left corner is given by $$x_{LU} = \frac{b_U - b_L}{a_L - a_U}$$

$$y_{LU} = a_U \times \frac{b_U - b_L}{a_L - a_U} + b_U$$

The coordinates ($x_C$, $y_C$) of the center is calculated from the vertical and horizontal lengths and inclinations. Specifically, supposing that the vertical length is $W_{UB}$ and the horizontal length is $W_{LR}$, the coordinates of the center is given by $X_C = X_{LU} + w_{LR} \times 0.5 + (w_{LR} \times 0.5)/dx$ $Y_C = Y_{LU} + w_{UB} \times 0.5 + (W_{UB} \times 0.5)/dy$ where dx represents the number of pixels corresponding to the denominator of the inclination (1/dx) of the upper or lower side of the to-be-recognized object P, and dy the number of pixels corresponding to the denominator of the inclination (1/dy) of the right or left side of the to-be-recognized object P, as is shown in upper right and lower left portions of FIG. 13.

The thus-obtained position information or inclination are input to a recognizing section 109, which in turn performs recognizing processing on the basis of the position determined by the entire-object position determining section 108.

For example, recognition can be performed by digitizing only the pixels in the internal of the determined entire image, i.e. the to-be-recognized object P, and matching the digitization result with dictionary data stored in the reference image data memory 110. Recognition can also be performed by comparing the average luminance of the pixels of only the to-be-recognized object P with a reference value stored in the reference image data memory 110.

A second embodiment will now be described.

Figure 14:
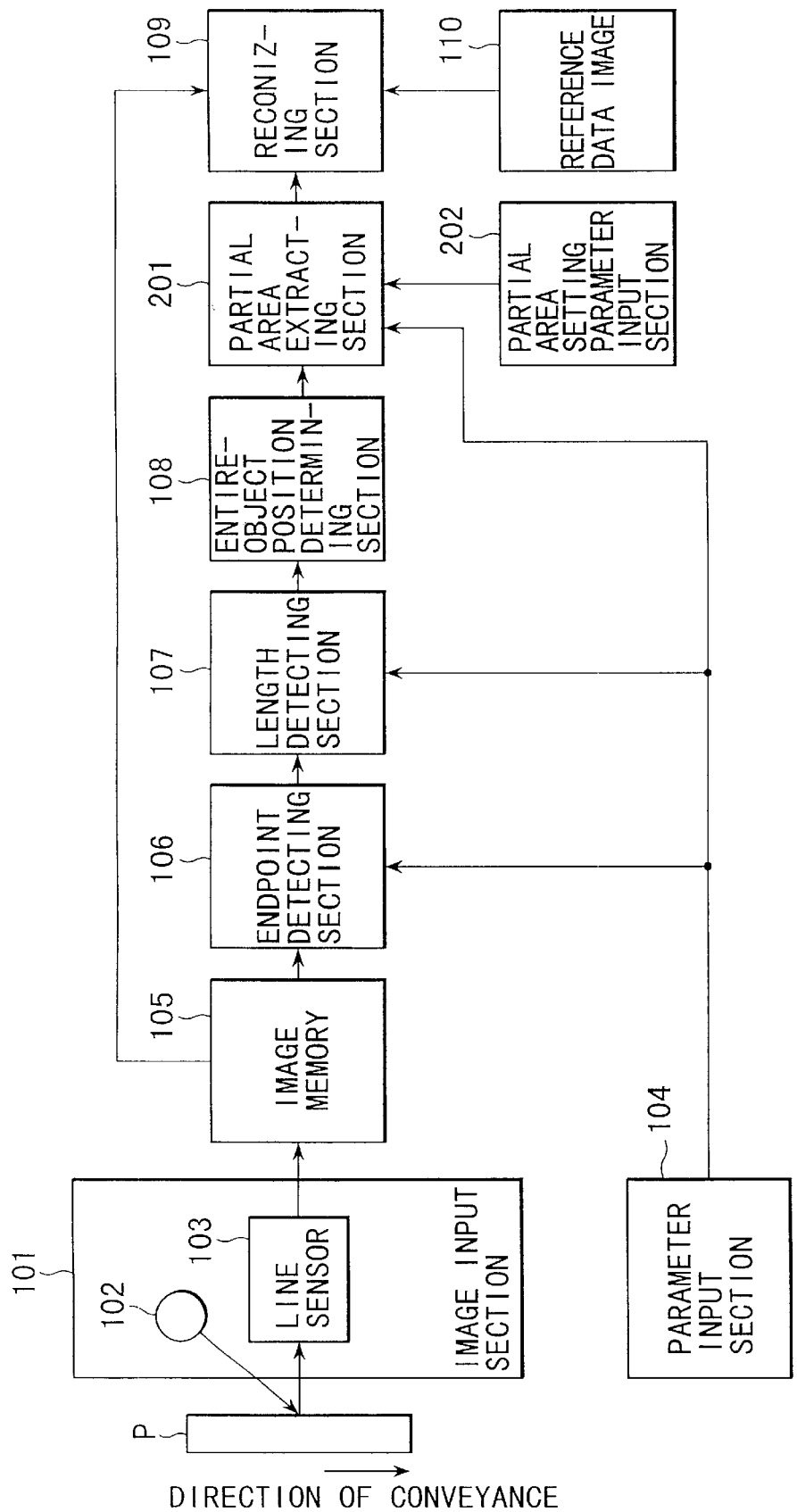
FIG. 14 is a schematic block diagram illustrating the structure of an image recognizing apparatus according to a second embodiment of the invention.

FIG. 14 roughly shows the structure of an image recognizing apparatus according to the second embodiment. The second embodiment differs from the first embodiment only in that in the second embodiment, a partial area extracting section 201 and a partial area setting parameter input section 202 are located after the entire-object position determining section 108. In other words, in this embodiment, only a partial area of the to-be-recognized object P is recognized instead of its entire area.

Figure 2:
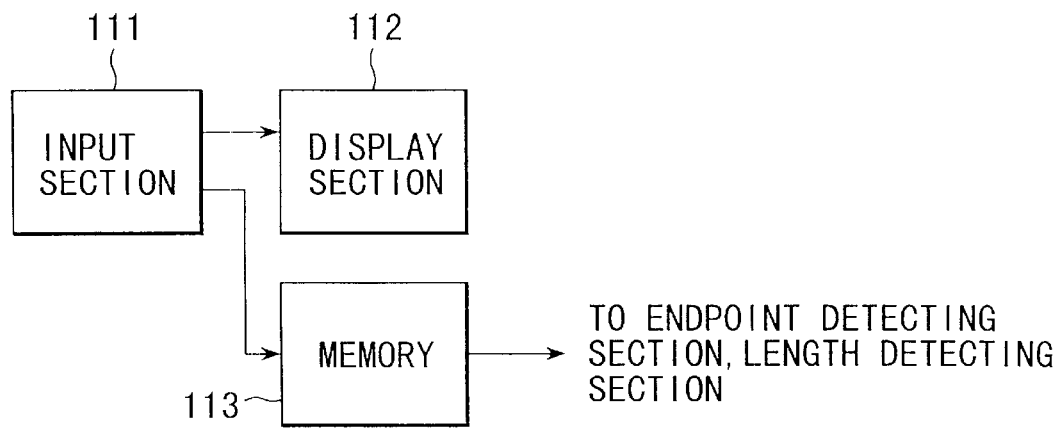
FIG. 2 is a block diagram illustrating the structure of a parameter input section.

The partial area setting parameter input section 202 has the same structure as the parameter input section 104 shown in FIG. 2, and parameters to be input include the size (vertical or horizontal length) of the partial area, a reference point for setting the partial area, and a relative ratio (which will be described below) from the reference point. The scale of the partial area is the exact same scale (mm), while the size to be input into the parameter input section 105 is obtained by multiplying the exact same scale by the image reading resolution (lines/mm).

Figure 15:
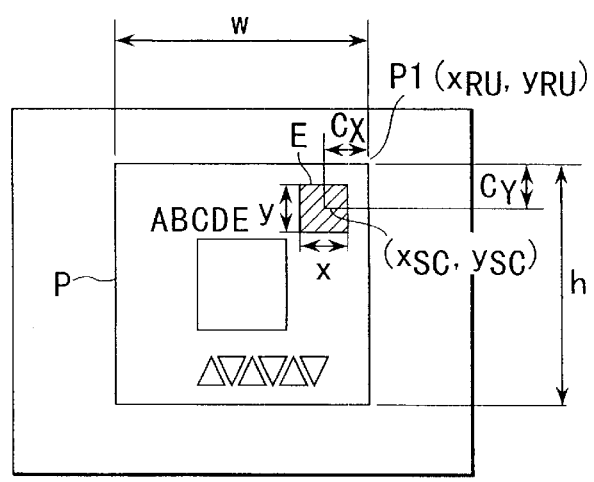
FIG. 15 is a view useful in explaining a partial area within an image of a to-be-recognized object.

The parameters will be described with reference to an example shown in FIG. 15. Suppose that the hatched area E is the partial area. The vertical and horizontal lengths of the partial area E are represented by y and x, respectively, and the reference point which is located at an upper right portion is represented by P1. Supposing that the width (i.e. horizontal length) and height of the to-be-recognized object P are represented by w and h, respectively, and the x-directional distance from the reference point P1 to the center of the partial area E is represented by $c_X$, the x-directional relative ratio $x_R$ is $c_X/w$. Further, supposing that the y-directional distance from the reference point P1 to the center of the partial area E is represented by $c_Y$, the y-directional relative ratio $Y_R$ is $c_Y/h$.

The parameters input by the partial area setting parameter input section 202 are sent to the partial area extracting section 201 together with the parameters input by the parameter input section 104.

The partial area extracting section 201 extracts a partial area corresponding to the state of conveyance on the basis of data, which are obtained by the entire-object position determining section 108 and concern the four corners, center, vertical and horizontal lengths and inclination of the to-be-recognized object P. The center position $(X_{SC}, y_{SC})$ of the partial area E is given by $$x_{SC} = x_{RU} - w \cdot x_R + w \cdot x_R/dx$$

$$y_{SC} = y_{RU} - h \cdot y_R + h \cdot y_R/dy$$

The partial area E is extracted on the basis of the center position obtained by the above equations. Since the entire-object position determining section 108 obtains four corners on the basis of the four sides of the to-be-recognized object P, it can obtain ideal four corners which are not influenced by, for example, an actually folded corner. Accordingly, the section 108 is free from loss of the reference point P1, and can use, as the reference point, a corner of the to-be-recognized object P closest to the partial area E.

As described above, in the apparatuses, according to the first and second embodiments, for recognizing an image on a to-be-recognized object P conveyed, the conveyed object P can be recognized accurately on the basis of information (size, luminance, etc.) on an already-known to-be-recognized object P, or information on allowable values during conveyance (the amounts of skew, slide, etc.). As a result, an image on the to-be-recognized object P can be recognized without being influenced by the state of conveyance, a folded corner, breakage, a stain, etc.

A third embodiment will now be described.

Figure 16:
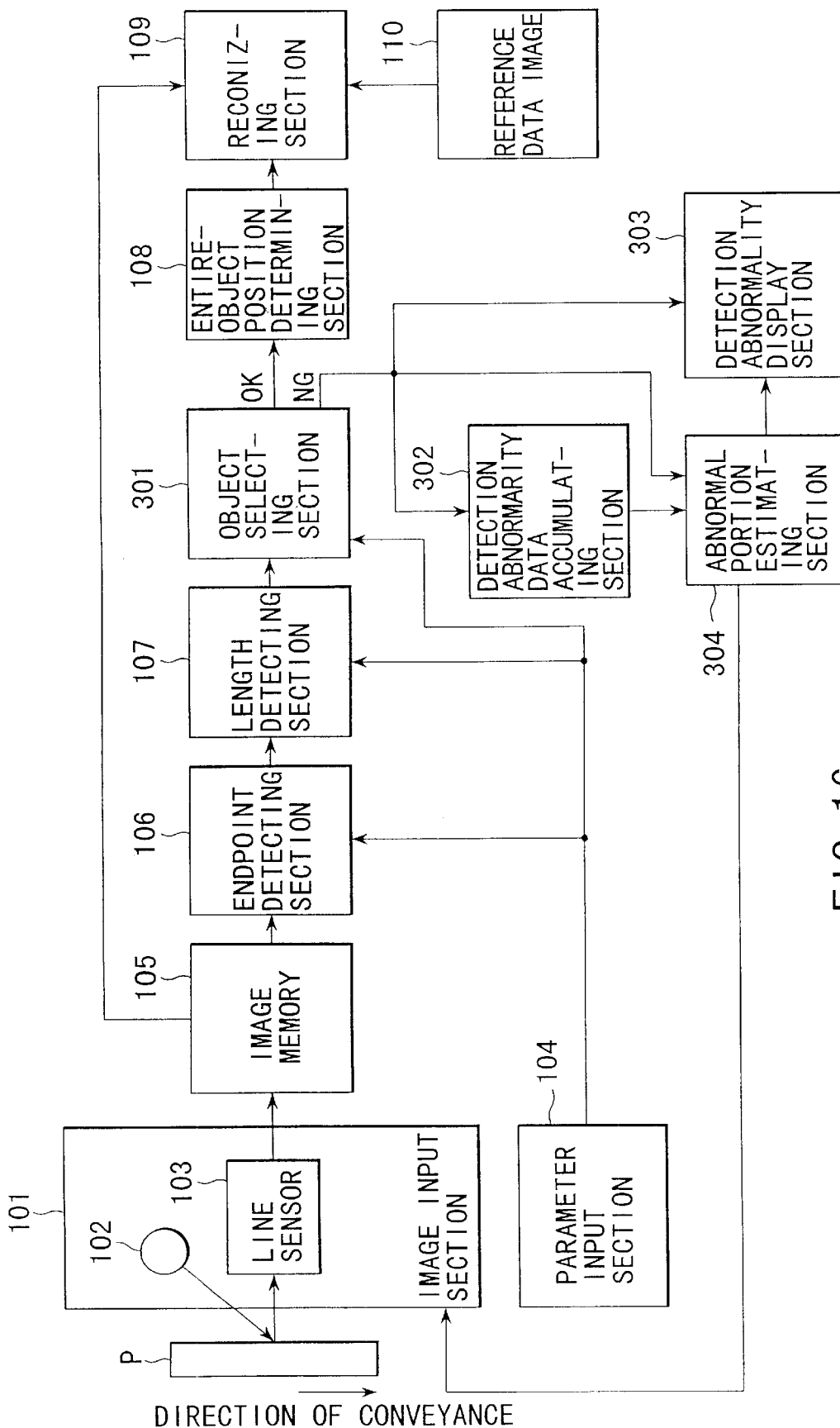
FIG. 16 is a schematic block diagram illustrating the structure of an image recognizing apparatus according to a third embodiment of the invention.

FIG. 16 roughly shows the structure of an image recognizing apparatus according to the third embodiment. The third embodiment differs from the first embodiment only in that the third embodiment further comprises an object selecting section 301, a detection abnormality data accumulating section 302, a detection abnormality display section 303 and an abnormal portion estimating section 304. In other words, in this embodiment, an image on the to-be-recognized object P can be recognized without being influenced by the state of conveyance.

The object selecting section 301 determines, on the basis of pairs of endpoints detected by the length detecting section 107, whether or not the position of the to-be-recognized object P can be determined. Specifically, the section 301 judges, from the number of pairs of endpoints detected and the distance between each pair, whether or not the position of the entire object P can be determined. To determine the position of the entire object P, two pairs or more of endpoints, which satisfy the endpoint distance range set by a parameter, are necessary in each of the vertical and horizontal directions. The section 301 judges whether or not this condition is satisfied.

Figures 17, 18:
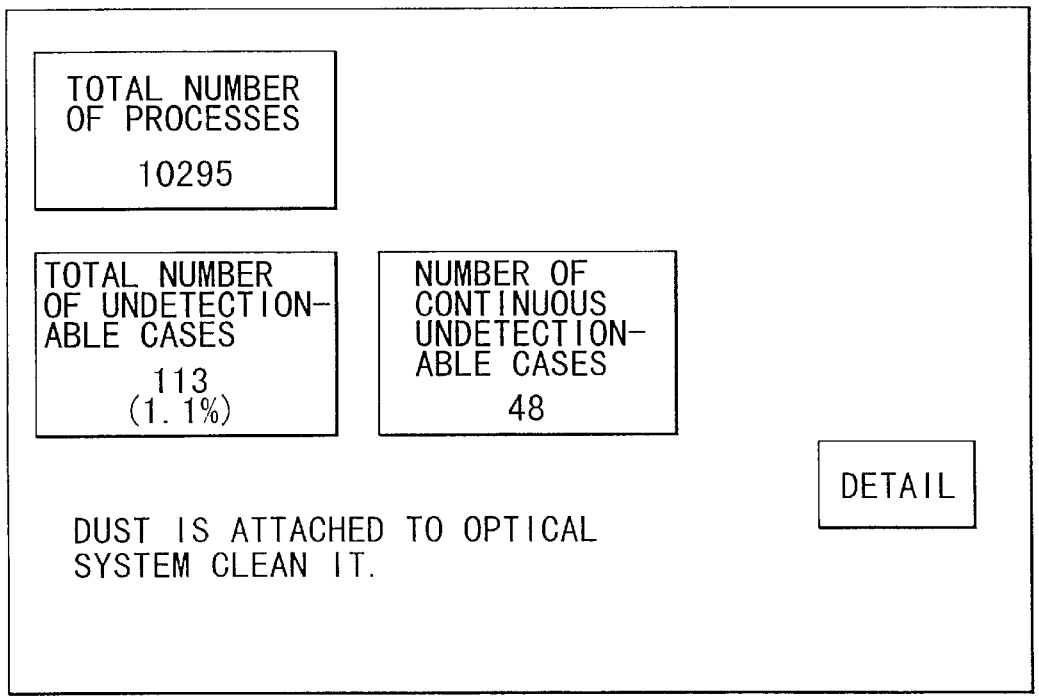
FIG. 17 is a view showing an example of the contents of a memory for accumulating detection abnormality data.
FIG. 18 is a view showing an example of the display screen of a detection abnormality display section.

If two or more pairs which satisfy the condition cannot be found, it is determined that the to-be-recognized object P cannot be detected, and information on the endpoints detected so far is accumulated in the detection abnormality data accumulating section 302. FIG. 17 shows an example of accumulated data. In this case, one set of data is stored for one process number. The data set includes the number of detected endpoints and their distances.

The process number indicates the number of a process in which detection could not be performed. In other words, the process number indicates where the to-be-recognized object P stands in the order of processed objects. To determine whether endpoints which could not be detected are located in the vertical or horizontal direction, two kinds of memories of a data structure as shown in FIG. 17 may be prepared, or a flag that indicates the direction may be added after the process number.

The accumulated data is not limited to the above, but may include position or luminance information of endpoints in addition to the above data.

The object selecting section 301 comprises a counting section for counting the number of cases where detection cannot be performed. This counting section includes a first counter for counting the total number of the undetectionable cases which have occurred while it is operated, and also a second counter for counting the number of undetectionable cases which have occurred continuously. These counters are initialized (the counter value is reset to 0) when the power is turned on. Further, the first counter counts one when there is a to-be-recognized object P that cannot be detected, while the second counter is reset to "0" when there is a to-be-recognized object P that can be detected, and counts one when there is a to-be-recognized object P that cannot be detected. The counter results can be referred to via the abnormal portion estimating section 304, when necessary.

When there is a to-be-recognized object P that cannot be detected, the detection abnormality display section 303 displays information indicative of it. This section 303 is formed of a liquid crystal display or an LED. Where the section 303 is formed of an LED, it flashes when a to-be-recognized object P that cannot be detected has been found.

Further, where the section 303 is formed of a liquid crystal display, it displays data as shown in FIG. 18. FIG. 18 shows an example of a display screen which displays data indicating that 48 undetectionable cases have continuously occurred. At this time, the system stops the recognizing operation. The detection abnormality display section 303 displays a message indicative of a phenomenon (attachment of dust to the optical system) estimated by the abnormal portion estimating section 304, and also a message indicative of measures for eliminating the phenomenon (cleaning). Moreover, if a "detail" button located on the right hand is pushed, the cause of the phenomenon indicated by the message, i.e. data stored in the detection abnormality data accumulating section 302 or analysis results of the data, is displayed.

When undetectionable cases have continuously occurred, the abnormal portion estimating section 304 estimates the cause. If the second counter (for counting the number of undetectionable cases that have continuously occurred) counts "2" or more, or shows a value higher than a set value, the abnormal portion estimating section 304 analyzes the last detection abnormality data stored in the detection abnormality data accumulating section 302. Where data as shown in FIG. 17 is stored, analysis is performed by comparing the number of vertical (or horizontal) endpoints and distances therebetween with pre-registered abnormal phenomena data.

Figure 19:
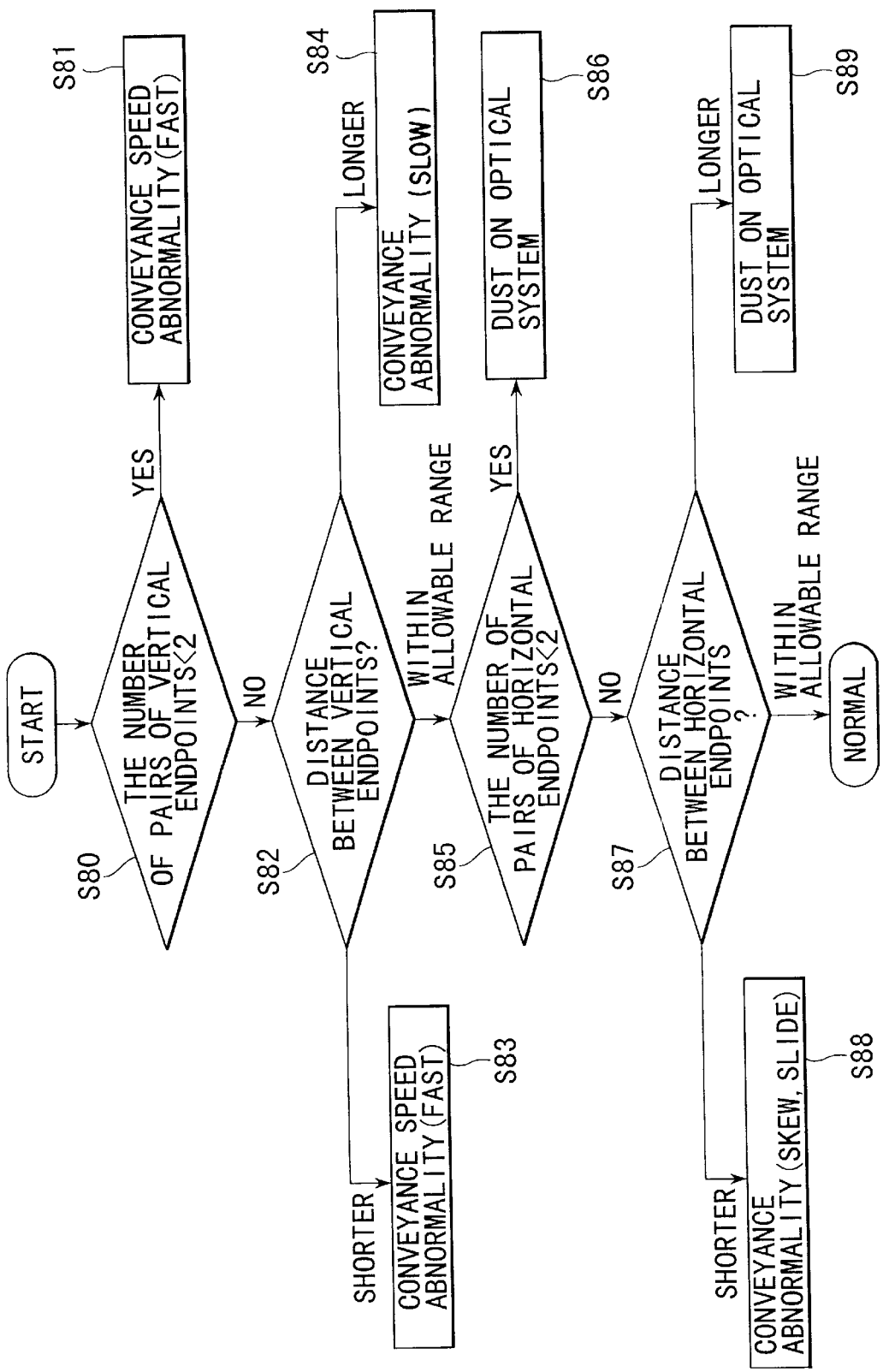
FIG. 19 is a flowchart useful in explaining a process performed by an abnormal portion estimating section.

FIG. 19 is a flowchart useful in explaining the analysis process. In the figure, the phenomena recited in rectangular blocks indicate estimated abnormal ones. Each abnormal phenomenon is estimated by comparing the last detection abnormality data stored in the detection abnormality data accumulating section 302, with a corresponding allowable value.

The order of the analysis steps is not limited to that shown in FIG. 19. Further, the data to be used is not limited to the last one data item, but the total amount of data which has occurred continuously may be used. For example, the number of objects is counted which do not satisfy a condition for each of four analysis items at steps S80, S82, S85 and S87 in FIG. 19 (i.e. the number of pairs of vertical endpoints, the distances therebetween, the number of pairs of horizontal endpoints, and the distances therebetween). Then, an abnormal phenomenon related to the item for which the counted value is maximum is estimated as the present abnormal state.

The estimated abnormal state is fed back to the system if it can be automatically normalized. For example, where the conveyance speed is abnormal, data is sent to the conveyance speed controller, which in turn adjust the conveyance speed on the basis of the data. On the other hand, if the abnormal state cannot be automatically normalized, the system stops and the detection abnormality display section 303 displays a message indicative of it, thereby warning the user.

As described above, in the apparatus, according to the third embodiment, for recognizing an image on a to-be-recognized object P conveyed, the object P can be accurately detected on the basis of information on the already known object P or information on allowable values during conveyance. When cases where the to-be-recognized object P cannot be detected have continued, the user is warned, and an abnormal portion of the system can be found at an early stage by estimation.

A fourth embodiment will be described.

Figure 20:
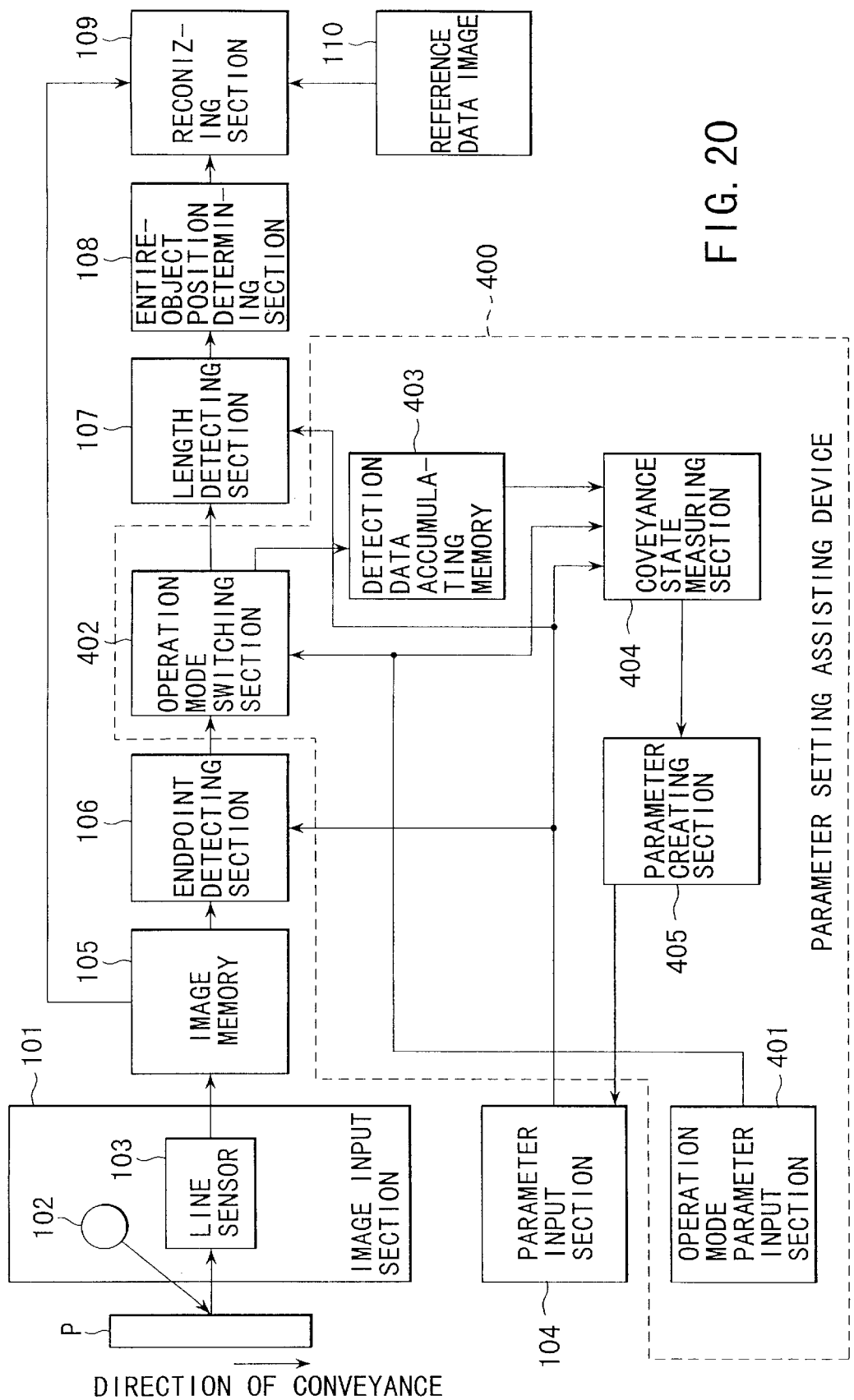
FIG. 20 is a schematic block diagram illustrating the structure of an image recognizing apparatus according to a fourth embodiment of the invention.

FIG. 20 roughly shows the structure of an image recognizing apparatus according to the fourth embodiment. The fourth embodiment differs from the first embodiment only in that the fourth embodiment further comprises a parameter setting assisting device 400. In other words, in this embodiment, the conveyance state of the to-be-recognized object P is measured, and the measurement result is used as a parameter for detecting the to-be-recognized object P to thereby realize further accurate detection.

The parameter setting assisting device 400 comprises an operation mode parameter input section 401, an operation mode switching section 402, a detection data accumulating memory 403, a conveyance state measuring section 404 and a parameter creating section 405.

Each element of the device 400 will be described in detail.

The operation mode parameter input section 401 is used to input a signal indicating whether the system is performing parameter setting or a normal operation, and includes input means such as a keyboard, a mouth, a touch panel, a switch, and display means for displaying the input result. When setting mode is selected as the operation mode, the operation mode switching section 402 switches the mode to the setting mode. In the setting mode, no recognizing processing is performed, and data is continuously accumulated in the detection data accumulating memory 403.

The detection data accumulating memory 403 accumulates pairs of endpoints detected by the endpoint detecting section 106, grouping the pairs vertically and horizontally, each time they are detected. Specifically, the memory stores, as one data item, four data pieces which consist of the x-coordinate and y-coordinate of one endpoint, and the x-coordinate and y-coordinate of another endpoint corresponding to the one endpoint. Further, as shown in FIG. 17, a serial number is attached to each to-be-recognized object P, and data is stored in units of one object P.

When the operation mode has been shifted from the setting mode to normal mode, the conveyance state measuring section 404 measures a conveyance state such as skew or slide on the basis of data accumulated so far.

When measuring a skew state, the conveyance state measuring section 404 first compares the vertical length of the to-be-recognized object P with its horizontal length, which are input to the parameter input section 104, thereby determining which one is longer. If the vertical length is longer, a line approximate to the left side of each to-be-recognized object P is obtained. If, on the other hand, the horizontal length is longer, a line approximate to the upper side of each to-be-recognized object P is obtained. Using data on a longer side of the to-be-recognized object P realizes a more reliable approximate line. The coefficient a obtained by the approximate line indicates the inclination of a specified side. The same measurement as above is performed on all objects P accumulated in the detection data accumulating memory 403, thereby determining a maximum coefficient $a_{MAX}$. Supposing that the allowable value (i.e. the upper limit) for length detection is represented by s, and the inclination of the object P is represented by $\theta$, the following equation is obtained:

$$s = \tan \theta$$

$\theta$ is obtained from arc tan $a_{MAX}$, and this angle indicates the maximum degree of skew. The allowable value can be set by inputting $a_{MAX}$ as the upper limit.

To measure the degree of slide, only detection data on horizontal endpoints is used, which is included in the data accumulated in the detection data accumulating memory 403. Supposing that the horizontal length of the to-berecognized object P is represented by w, the average x-directional length of the left-hand endpoints from the y-axis by $L_{AV}$, and the center of the field of vision by c, the slide degree $S_L$ is given from $$S_L=(C-w/2)-L_{AV}$$

The slide degrees of all objects P are calculated, thereby obtaining its maximum value. Inputting the maximum value as a parameter to the endpoint detecting section 106 enables narrowing of the endpoint scanning range, and hence reduction of the number of occasions of scanning.

The parameter creating section 405 stores, as initial data, parameters stored in a memory included in the parameter input section 104. The section 405 rewrites a skew angle and/or a slide degree, which are included in the initial data, into the measurement values obtained by the conveyance state measuring section 404. The rewritten parameters are transferred to the memory in the parameter input section 104, thereby updating the parameters.

As described above, in the apparatus, according to the fourth embodiment, for recognizing an image on a to-be-recognized object P conveyed, the conveyance state of each object P can be measured, and using the measurement result as a parameter for detecting the position of the object P enables more accurate detection of the object P.

As described above in detail, the invention can provide an image recognizing apparatus capable of accurately detecting and recognizing to-be-recognized objects even if their positions shift while they are conveyed.

It is a matter of course that the invention is not limited to the above-described embodiments, but may be modified in various manners without departing from its scope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image recognizing apparatus comprising:
   image input means for inputting an image of a to-be-recognized object;
   endpoint detecting means for detecting, on the basis of the image input by the image input means, a plurality of pairs of endpoints which indicate border points between the to-be-recognized object and a background thereof, the pairs of endpoints existing on vertical and horizontal lines that pass through the to-be-recognized object;
   length detecting means for detecting vertical and horizontal lengths of the to-be-recognized object on th e basis of endpoint information supplied from the endpoint detecting means;
   comparing means for comparing length information supplied from the length detecting means with values falling within a range depending on an ideal length x and a skew range θ for determining endpoint pair information;
   position determining means for determining a position of an entire portion of the to-be-recognized object on the basis of the endpoint pair information supplied from the comparing means; and
   recognizing means for comparing the image input by the image input means with a reference image on the basis of the position determined by the position determining means, thereby recognizing the image input by the image input means.

2. An apparatus according to claim 1, further comprising parameter input means for inputting conveyance conditions and information relating to the to-be-recognized object.

3. An apparatus according to claim 2, wherein the endpoint detecting means includes:
   luminance difference detecting means for detecting a luminance difference between a target pixel and a pixel next to the target pixel;
   means for determining whether the luminance difference detected by the luminance difference detecting means is greater than a predetermined luminance difference input by the parameter input means;
   means for judging that the luminance of the target pixel is a background luminance if the detected luminance difference is greater than the predetermined luminance difference; and
   means for determining that the pixel next to the target pixel is an endpoint if a luminance difference between the background luminance and a luminance of each of pixels ranging from the pixel next to the target pixel to an n-th pixel is greater than the predetermined luminance wherein n is a predetermined number.

4. An apparatus according to claim 2, wherein the length detecting means includes selecting means for selecting endpoint pair information from the endpoint pair information detected by the endpoint detecting means, on the basis of the conveyance conditions and the information relating to the to-be-recognized object input by the parameter input means.

5. An apparatus according to claim 4, wherein the length detecting means further includes means for determining that a maximum distance included in distances of the endpoints selected by the selecting means is a length of the to-be-recognized object.

6. An apparatus according to claim 2, wherein the length detecting means includes selecting means for selecting endpoint pair information from the endpoint pair information detected by the endpoint detecting means, on the basis of a skew state of the to-be-recognized object and an ideal length input by the parameter input means.

7. An apparatus according to claim 2, wherein the length detecting means includes means for determining that an average value of distances ranging from a maximum distance to an n-th distance included in distances of the endpoints selected by the selecting means is a length of the to-be-recognized object wherein n is a predetermined number.

8. An apparatus according to claim 2, wherein the position determining means includes:
   means for obtaining a line approximate to each of sides of the to-be-recognized object, using endpoint pair information supplied from the comparing means; and
   corner judging means for judging, as corner coordinate of the to-be-recognized object, coordinates of each intersection between approximate lines obtained by the means for obtaining a line.

9. An apparatus according to claim 8, wherein
   the position determining means further includes extracting means for extracting a partial area of the to-be-recognized object on the basis of the corner coordinates judged by the corner judging means; and
   the recognizing means includes means for comparing the partial area extracted by the extracting means, with a corresponding area in the reference image, thereby recognizing the image input by the image input means.

10. An image recognizing apparatus comprising:

image input means for inputting an image of a to-be-recognized object;

endpoint detecting means for detecting, on the basis of the image input by the image input means, a plurality of pairs of endpoints which indicate border points between the to-be-recognized object and a background thereof, the pairs of endpoints existing on vertical and horizontal lines that pass through the to-be-recognized object;

length detecting means for detecting vertical and horizontal lengths of the to-be-recognized object on the basis of endpoint information supplied from the endpoint detecting means;

comparing means for comparing length information supplied from the length detecting means with values falling within a range depending on an ideal length x and a skew range θ for determining endpoint pair information;

determining means for determining whether or not a position of the to-be-recognized object can be detected, on the basis of the endpoint pair information supplied from the comparing means; and accumulating means for accumulating endpoint pair information concerning the to-be-recognized object if the determining means determines that the position of the to-be-recognized object cannot be detected;

display means for displaying a determination result of the determining means if the result indicates that the position of the to-be-recognized object cannot be detected;

abnormal portion estimating means for estimating an abnormal portion of the image recognizing apparatus on the basis of the endpoint information accumulated by the accumulating means;

position determining means for determining the position of the to-be-recognized object if the determining means determines that the position of the to-be-recognized object can be detected; and recognizing means for comparing the image input by the image input means with a reference image on the basis of the position determined by the position determining means, thereby recognizing the image input by the image input means.

11. An apparatus according to claim 10, wherein the determining means has means for judging that the position of the entire to-be-recognized object can be detected, if there are two or more pairs of endpoints in each of vertical and horizontal directions.

12. An apparatus according to claim 10, wherein the display means has means for displaying, if there are continuous cases where the to-be-recognized object cannot be detected, the number of the continuous cases and the number of total cases where the to-be-recognized object cannot be detected.

13. An image recognizing apparatus comprising: image input means for inputting an image of a to-be-recognized object;

parameter input means for inputting, as parameters, information and conveyance conditions concerning the to-be-recognized object;

endpoint detecting means for detecting, on the basis of the image input by the image input means, a plurality of pairs of endpoints which indicate border points between the to-be-recognized object and a background thereof, the pairs of endpoints existing on vertical and horizontal lines that pass through the to-be-recognized object;

detection information storage means for storing endpoint pair information supplied from the endpoint detecting means;

conveyance state judging means for judging a conveyance state of the to-be-recognized object on the basis of the information stored in the detection information storing means;

parameter updating means for updating parameters input by the parameter input means on the basis of a judging result of the conveyance state judging means;

length detecting means for detecting vertical and horizontal lengths of the to-be-recognized object on the basis of endpoint information supplied from the endpoint detecting means;

comparing means for comparing length information supplied from the length detecting means with values falling within a range depending on an ideal length x and a skew range θ for determining endpoint pair information;

position determining means for determining a position of the to-be-recognized object on the basis of the endpoint pair information supplied from the length detecting means; and recognizing means for comparing the image input by the image input means with a reference image on the basis of the position determined by the position determining means, thereby recognizing the image input by the image input means.

14. An apparatus according to claim 13, wherein the conveyance state judging means has means for judging a degree of skew of the to-be-recognized object.

15. An apparatus according to claim 13, wherein the conveyance state judging means has means for judging a degree of slide of the to-be-recognized object.

16. An apparatus according to claim 13, further comprising:

operation mode parameter input means for designating one of an operation mode for image recognition and an operation mode for parameter change; and operation mode switching means for supplying one of the length detecting means and the detection information storing means with the endpoint pair information output from the endpoint detecting means, on the basis of an operation mode parameter output from the operation mode parameter input means.

* * * * *